United States Patent [19]

Falke et al.

[11] Patent Number: 5,034,367
[45] Date of Patent: Jul. 23, 1991

[54] SUPPORTED CATALYSTS FOR DECOMPOSING OZONE, METHOD OF PRODUCING SUCH CATALYSTS AND METHOD OF CATALYTICALLY DECOMPOSING OZONE

[75] Inventors: Holger Falke, Hemmingen; Guenther Strauss, Hanover, both of Fed. Rep. of Germany

[73] Assignee: GUTEC, Gesellschaft zur Entwicklung von Umweltschutztechnologie mbH, Hanover, Fed. Rep. of Germany

[21] Appl. No.: 537,638

[22] Filed: Jun. 14, 1990

[30] Foreign Application Priority Data

Jun. 22, 1989 [DE] Fed. Rep. of Germany ....... 3920428

[51] Int. Cl.$^5$ .............................................. B01J 31/02
[52] U.S. Cl. .................................................... 502/159
[58] Field of Search ............................................. 502/159

[56] References Cited

U.S. PATENT DOCUMENTS

| 3,381,454 | 5/1968 | Sponsel et al. | 55/528 |
|---|---|---|---|
| 4,207,291 | 6/1980 | Byrd et al. | 422/122 |
| 4,315,837 | 2/1982 | Rourke et al. | 252/430 |
| 4,343,776 | 8/1982 | Carr et al. | 423/210 |
| 4,405,507 | 9/1983 | Carr et al. | 252/466 |
| 4,680,040 | 7/1987 | Gooray et al. | 502/417 |

FOREIGN PATENT DOCUMENTS

| 38224 | 10/1981 | European Pat. Off. . |
| 3149901 | 6/1982 | Fed. Rep. of Germany . |
| 3522287 | 1/1987 | Fed. Rep. of Germany . |
| 1505843 | 3/1978 | United Kingdom . |

OTHER PUBLICATIONS

Laing and Meyers, XDJ, vol. 6, No. 5, Sep./Oct. 1981, p. 217.
Derwent Abstract of JP 83-64, 135 which is equivalent to Chemical Abstracts 99:127764b.
Derwent Abstract of Jp 2-4,454.

*Primary Examiner*—Patrick P. Garvin
*Assistant Examiner*—Brent M. Pebbles
*Attorney, Agent, or Firm*—Foley & Lardner

[57] ABSTRACT

Supported catalysts for decomposing ozone in gases, in particular for cleaning inhaled air, comprising metals and/or transition metal oxides, preferably hopcalite, as a catalytically active coating on foamed, open-pored organic polymer supports, such as open-called polyurethane polymer foams, a method for producing a supported catalyst, and a method for catalytically decomposing ozone are disclosed.

8 Claims, No Drawings

SUPPORTED CATALYSTS FOR DECOMPOSING OZONE, METHOD OF PRODUCING SUCH CATALYSTS AND METHOD OF CATALYTICALLY DECOMPOSING OZONE

BACKGROUND OF THE INVENTION

The present invention relates to a supported catalyst for decomposing ozone in gases at temperatures below about 50° C., to a method for producing a supported catalyst for decomposing ozone in gases, and to a method for catalytically decomposing ozone using a polymer foam supported catalyst.

Ozone, a molecule comprising three oxygen atoms, is used in industrial processes and serves, for instance, as a bleaching agent for oils, fibers or paper, for disinfecting swimming pool water and for cleaning industrial waste water. It also forms in an undesired manner due to the action of ionizing or ultraviolet radiation on atmospheric oxygen, e.g. in the vicinity of electron beam sources, for instance in copiers or around mercury quartz lamps or sunray lamps. Furthermore, it occurs in nature, for instance in the stratosphere, but also on the ground, particularly in "smog" weather conditions.

Ozone is extremely toxic and also very reactive. The ozone content in the exhaust air of industrial plants, for instance in the exhaust air which is produced during oil refining or when disinfecting raw water or waste water, should be reduced where possible in order to protect the environment. Of course, ozone is also highly problematic for health reasons in inhaled air, for instance in fresh air taken from the stratosphere for supplying high-flying aircraft, or close to the ground in smoggy weather conditions. The desirable decomposition of the ozone in industrial waste gases or inhaled air is predominantly effected by catalysis. Many metals, in particular platinum group metals, e.g. palladium or platinum, and metal oxides, for instance transition metal oxides, have been used in pure form or as a mixture as catalytically active components in catalysts for decomposing ozone, for instance in the form of bulk supported catalysts. Mixed metal oxides are highly suitable, particularly mixtures containing manganese dioxide and copper oxide which have become known as "hopcalites". Hopcalites may consist of manganese dioxide and copper oxide, but they may also contain additional metal oxides, for instance nickel oxide, cobalt oxide or silver oxide, and, if desired, promoters such as lithium oxide and/or potassium oxide.

SUMMARY OF THE INVENTION

It is an object of the invention to provide new supported catalysts with advantageous properties for decomposing ozone.

Another object of the invention is to provide a method of producing a supported catalyst for decomposing ozone.

A further object of the invention is to provide a method of catalytically decomposing ozone using a supported catalyst.

Yet another object of the invention is to provide a method for catalytically decomposing ozone in gases at temperatures below about 50° C.

The objects of the invention are achieved in accordance with a first aspect of the present invention by providing a supported catalyst for decomposing ozone in a gas at temperatures below about 50° C., wherein the catalyst comprises a foamed, substantially open-pored organic polymer support material coated with an effective ozone decomposing amount of a catalytically active component which contains at least one metal or metal oxide which catalyzes the decomposition of ozone.

According to a further aspect of the invention, the objects are achieved by providing a method for producing a supported catalyst for decomposing ozone in gases at temperatures below about 50° C., comprising coating a foamed, substantially open-pored organic polymer support with an effective ozone decomposition catalyzing amount of a catalytically active component comprising at least one metal or metal oxide which catalyzes the decomposition of ozone.

Still other objects of the invention are achieved by providing a method for catalytically decomposing ozone, comprising passing an ozone-containing gas at a temperature below about 50° C. through a supported catalyst comprising a foamed, substantially open-pored organic polymer support material coated with a catalytically active component which contains an effective ozone decomposition catalyzing amount of at least one metal or metal oxide which catalyzes the decomposition of ozone.

DETAILED DESCRIPTION OF PREFERRED EMBODIMENTS

The supported catalyst according to the invention for decomposing ozone in gases at temperatures below about 50° C., comprising a support material and a catalytically active component which contains one or more metals and/or one or more metal oxides, is characterized in that the support material is a foamed, substantially open-pored organic polymer which is coated with the catalytically active component.

In principle, all known foamed, substantially open-pored organic polymers are usable as supports within the scope of the present invention. A large number of such polymers having different properties are known to persons skilled in the art. For instance, foamed polymers (foam plastics) of greatly differing hardness, from soft foams to hard foams, may be used. The pore size may be in the range from 0.1 to 10 mm and the density between 0.005 and 0.05 g/cm$^3$.

It is of decisive importance that a substantially open-pored organic polymer is used as a support. Pores are cavities in the respective foamed polymer. Open pores are connected to the surrounding medium, while closed pores are closed in themselves and do not allow medium to penetrate. Within the scope of the present invention, the term "open-pored" refers to foamed polymers having pores which are connected via openings in the pore wall with other pores and in this manner finally with the surrounding medium, e.g. the ambient air.

Generally, the higher the proportion of open pores in the foamed polymer through which the gaseous medium flows, the more suitable the polymer as a catalyst support. Indeed, in principle a polymer which has a significant proportion of closed pores as well as open pores and is thus mixed-pored, may also be used in the present invention as a catalyst support. However, the smaller effective surface area and the higher pressure drop generally make the use of such a polymer less advantageous. Within the framework of the present invention, therefore, substantially open-pored polymers are used as supports. As used herein, the term "substantially open-pored" means that a substantial proportion, for instance about 90% and more, preferably 95 to about 100%, of the pores contained in the polymer should be open.

It is known that foamed polymers occur in closed-pore, mixed-pore or open-pore form (in another type of description these foams are also called closed-cell, mixed-cell and open-cell), depending on the manner in which they are produced. It is also known that closed pores which may be present can be converted into open pores by chemical or physical methods. This process is called reticulation. Within the scope of the present invention, substantially open-pored foamed polymers which are directly substantially open-pored when first produced may be used. Equally, substantially open-pored foamed polymers which are initially closed-pored or mixed-pored when first produced and are then reticulated may also be used.

A large number of foamed, substantially open-pored polymers made of widely differing chemical materials are known to persons skilled in the art and may be used in the supported catalysts of this invention. Examples of highly suitable polymers include those based on polystyrene, styrene copolymers, polyvinyl chloride or polyurethane and also polychloroprene, because they are particularly resistant to ozone and can therefore also be used for long-term applications.

Foamed, substantially open-pored organic polymers based on polyurethanes are highly suitable. These are available in the form of soft to hard foam plastics and may be produced in a known manner from isocyanates and water, carboxylic acids, diols, glycol ethers, and/or polyols. If desired, propellant gases, emulsifiers and other additives may be used in the production of the open-pored polymers.

The catalytically active component is advantageously present in the supported catalyst of the invention in a quantity of 5% by weight to 95% by weight, preferably 20% by weight to 90% by weight, and particularly preferably from 50 to 90% by weight, relative to the total weight of the supported catalyst. If it is present in smaller quantities than those given, the degree of reaction of the ozone decomposition falls to a value which is too low. If it is used in larger quantities than those given, the catalytically active component may not be utilized effectively.

The particle size of the applied catalytically active component should advantageously be in the range from 10 to 500 $\mu$.

All catalytically active metals, particularly noble metals, for instance platinum group metals such as palladium or platinum, and metal oxides, particularly transition metal oxides, such as manganese dioxide, cobalt oxide, copper oxide or nickel oxide, may be used as the catalytically active component. A pure catalytically active metal or a mixture of several catalytically active metals and/or a catalytically active metal oxide or a mixture of several catalytically active metal oxides may be used. In this case, of course, combinations of metals with metal oxides may also be used.

Preferred supported catalysts according to the invention comprise substantially open-pored foamed polymers, coated with hopcalite as a catalytically active component. Hopcalites are oxide mixtures, calcined at temperatures of 300° C. and more, which either consist of manganese dioxide and copper oxide or contain a substantial content of manganese dioxide and copper oxide in combination with other oxides, for instance tricobalt tetroxide, silver oxide, nickel oxide, aluminum oxide, cerium oxide, lithium oxide and/or potassium oxide. A suitable mixed oxide for use as a catalytically active coating is commercially available from Kali-Chemie AG, Hannover, Germany under the name SG 2118.

Supported catalysts according to the invention which have a polyurethane polymer support material coated with a hopcalite as a catalytically active component are especially preferred. Particularly preferred are supported catalysts for decomposing ozone in gases at temperatures of below about 50° C. which have a foamed, substantially open-pored organic polymer support based on a polyurethane, coated with a hopcalite as a catalytically active component in a quantity of 5 to 95% by weight, preferably 20 to 90% by weight, in particular 50 to 90% by weight, relative to the total weight of the supported catalyst.

The supported catalyst according to the invention may in principle exist in any spatial form, for instance in monolithic form in the form of blocks, plates, mats or spheres. The spatial volume may extend from a few cubic centimeters to several liters, for instance 10 or more liters.

A method for producing the supported catalysts according to the invention will be described next. The method according to the invention for producing supported catalysts for decomposing ozone in gases at temperatures below about 50° C. is characterized in that a foamed, substantially open-pored organic polymer is used as a support and that it is coated with one or more metals and/or one or more metal oxides as a catalytically active component.

In principle, all known foamed, substantially open-pored organic polymers, as have already been described above, can be used in the method according to the invention for producing the supported catalysts. Preferably polymers based on polyurethane, polyvinyl chloride, polystyrene or polychloroprene are used in the method according to the invention. Polymers based on polyurethane are particularly preferably used as supports in the method of the invention.

Foams having a pore size of 0.1 to 10 mm, and a foam density of 0.005 to 0.05 g/cm³ are very suitable.

In principle, foamed polymers of any spatial form may be used within the scope of the invention. For instance, polymers in the form of blocks, plates, mats or spheres of any desired dimension, with a spatial volume ranging from a few cubic centimeters, for instance 5 cm³, up to several liters, for instance 10 or more liters, can be used.

In principle, all metals or metal oxides which are known to decompose ozone catalytically may be used in the method according to the invention as the catalytically active component with which the support is coated. Preferably, the support is coated with a catalytically active component which contains a platinum group metal or a mixture of several platinum group metals, for instance platinum and/or palladium, and/or a transition metal oxide or a mixture of several transition metal oxides. Particularly preferably, the support is coated with mixed transition metal oxides, especially with hopcalites. Hopcalites are metal oxide mixtures which either consist of manganese dioxide and copper oxide or contain manganese dioxide and copper oxide and also additional oxides, e.g. nickel oxide, cobalt oxide or silver oxide and also other metal oxides such as aluminum oxide, cerium oxide, lithium oxide and/or potassium oxide.

Hopcalites having different compositions are known to persons skilled in the art and are usable as catalytically active components in the process. They are obtainable according to known methods. A very suitable metal oxide mixture is commercially available from Kali-Chemie AG, Hannover, Germany under the name SG 2118.

The support material may be coated with the catalytically active component according to known methods, for instance by contacting the support with a suspension of the component in water and subsequent drying.

Preferably the support is coated with a dry, powdered catalytically active component. The catalytically active component should be present in as finely distributed a form as possible, for instance in particles with a size of 10 to 500 $\mu$. The catalytically active component can be brought to such particle sizes for instance in ball mills.

Often it is possible to coat the support without any pretreatment by simply contacting the support and the active catalyst component, for instance by shaking them together in vibrator vessels. For example, supported catalysts according to the invention, which are very well suited for decomposing ozone in gases and which contain a polyurethane polymer as the foamed, substantially open-pored polymer support and comprise a hopcalite as the catalytically active component may be produced in a simple manner without additional pretreatment by contacting the support with finely-powdered hopcalite in order to coat the support, e.g. in shaking devices, vibrator vessels or rotary drums.

If desired, the support and the catalytically active component may also be pretreated in order to improve the adhesion of the catalytically active component to the surface of the foamed open-pored polymer. For instance, the catalytically active component may be heated to temperatures of 150 to 200° C. and then brought into contact with the support, which has not been previously treated. The heated powder softens the surface of the polymer and adheres as a result.

Furthermore, there is the possibility of subjecting the support to pretreatment. For instance, the support may be subjected to heat pretreatment, the support may be contacted with a solvent which solubilizes the surface and renders it tacky.

In the method for producing the supported catalyst according to the invention, the catalytically active component is applied in a quantity of 5 to 95% by weight, preferably from 20 to 90% by weight, particularly preferably from 50 to 90% by weight, relative to the total weight of the supported catalyst. If desired, the application process can be repeated until the desired amount of active component has been applied.

In a particularly preferred embodiment of the method according to the invention, a foamed, substantially open-pored organic polyurethane polymer is used as a support and is coated, without pretreatment, with a hopcalite in a quantity of from 5 to 95% by weight, preferably from 20 to 90% by weight, particularly preferably from 50 to 90% by weight, relative to the total weight of the supported catalyst.

Surprisingly, the supported catalysts according to the invention have proved useful for decomposing ozone in gases at temperatures below about 50° C. In accordance with a further aspect of the invention, a method is provided for catalytically decomposing ozone in gases at temperatures below about 50° C., in which an ozone-containing gas is passed through a supported catalyst of the type described above.

Preferably the method for catalytically decomposing ozone in gases is carried out at temperatures between about 10 and about 25° C. The ozone content of the gas may be up to 2% by weight. The method is, for instance, highly suitable for gases with an ozone content in the range from about 0.1 to about 1.5% by weight. The gas to be purified is preferably ozone-containing air. The relative humidity may range from 0 to above 90%.

The supported catalysts according to the invention may be used to process the exhaust air of industrial plants, to process inhaled air, to decompose ozone in copying equipment, or in air supply systems for aircraft, etc.

The supported catalysts according to the invention have surprising advantages. For instance, they are active at ambient temperature, they permit economic utilization of the catalytically active component, they are easy to handle, they are very light, they can be cut to desired dimensions on the spot, they are stable against blows and shocks, and they can be produced very simply.

The following illustrative example is intended to explain the invention in further detail without restricting its scope.

EXAMPLE 1.1 Production of the supported catalyst according to the invention.

A block of foamed, open-pored polyurethane polymer having a pore size of 0.5 mm and a density of 0.02 g/cm$^3$ was used as the support. The dimensions of the block used were 4×4×2 cm.

A mixed oxide which is a manganese dioxide/copper oxide mixture with a binder was used as the catalytically active component. This mixed oxide product is commercially available from Kali-Chemie AG, Hannover, Germany under the name SG 2118. The mixed oxide was ground in a ball mill to a particle size of 50 to 100 $\mu$ before use. In order to coat the support without any pretreatment of the support or the catalytically active material, the mixed oxide was allowed to trickle through the pores of the support material while the support material was being shaken until about 5.3 g of the active component had been applied per gram of support material. The coated supported catalyst, which was ready for use, contained 3.4 g of the catalytically active mixed oxide.

1.2 Use of the supported catalyst according to the invention for decomposing ozone.

The supported catalyst produced in Example 1.1 was placed in a tubular reactor equipped with gas supply and gas removal means. Air having a relative humidity of 90% and an ozone content of 16 g per m$^3$ gas was passed through the supported catalyst according to the invention at ambient temperature (about 25° C.) in a volume flow of 125 liters per hour. After passing through the supported catalyst according to the invention, the ozone content of the air was only about 2 g/m$^3$. The degree of reaction was therefore 87%.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all variations falling within the ambit of the appended claims and equivalents thereof.

What is claimed is:

1. A supported catalyst for decomposing ozone in a gas at temperatures below about 50° C., said catalyst comprising a foamed, substantially open-pored organic polymer support material coated with an effective ozone decomposing amount of a catalytically active component which contains at least one metal or metal oxide which catalyzes the decomposition of ozone, wherein said catalytically active component is coated directly on said support without interposed adhesive, and wherein said supported catalyst contains from about 50 to about 90 percent by weight of said catalytically active component relative to the total weight of the supported catalyst.

2. A supported catalyst according to claim 1, wherein said foamed, organic polymer is a polyurethane polymer.

3. A supported catalyst according to claim 2, wherein said foamed polymer has an average pore size in the range from 0.1 to 10 mm and a density of 0.005 to 0.05 g/cm$^3$.

4. A supported catalyst according to claim 1, wherein said support material is coated with hopcalite as a catalytically active component.

5. A method for producing a supported catalyst for decomposing ozone in gases at temperatures below about 50° C., said method comprising directly coating a foamed, substantially open-pored organic polymer support with an effective ozone decomposition catalyzing amount of a catalytically active component comprising at least one metal or metal oxide which catalyzes the decomposition of ozone, such that said supported catalyst contains from about 50 to about 90 percent by weight of said catalytically active component relative to the total weight of the supported catalyst.

6. A method according to claim 5, wherein said support is a polyurethane polymer foam.

7. A method according to claim 5, wherein said catalytically active component is applied to said support in a quantity of from 5 to 95% by weight, relative to the total weight of the resulting supported catalyst.

8. A method according to claim 5, wherein said catalytically active component is hopcalite.

* * * * *